United States Patent
Nakayama et al.

(10) Patent No.: US 8,607,817 B2
(45) Date of Patent: Dec. 17, 2013

(54) CONTROL METHOD AND DEVICE OF FILLED WATER VOLUME IN FLUID SPACE

(75) Inventors: Ken Nakayama, Yokohama (JP); Seiichi Noda, Yokohama (JP); Yoshimichi Kawakami, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 370 days.

(21) Appl. No.: 12/597,760

(22) PCT Filed: Oct. 18, 2007

(86) PCT No.: PCT/JP2007/070758
§ 371 (c)(1),
(2), (4) Date: Apr. 6, 2010

(87) PCT Pub. No.: WO2009/050826
PCT Pub. Date: Apr. 23, 2009

(65) Prior Publication Data
US 2010/0206052 A1 Aug. 19, 2010

(51) Int. Cl.
*F16K 21/18* (2006.01)
*G01M 3/02* (2006.01)

(52) U.S. Cl.
USPC .............................................. 137/386; 73/37

(58) Field of Classification Search
USPC ............ 73/49.2, 299, 149, 302, 49.1, 40.5 R; 137/386
See application file for complete search history.

(56) References Cited

U.S. PATENT DOCUMENTS

2007/0125157 A1  6/2007  Kawahara et al.

FOREIGN PATENT DOCUMENTS

| JP | 57004532 A | 1/1982 |
| JP | 58050444 A | 3/1983 |
| JP | 62008733 B | 2/1987 |
| JP | 8193909 A | 7/1996 |
| JP | 2007132834 A | 5/2007 |

OTHER PUBLICATIONS

ISR for PCT/JP2007/070758 mailed Jan. 22, 2008.

*Primary Examiner* — Daniel S Larkin
*Assistant Examiner* — Jamar Ray
(74) *Attorney, Agent, or Firm* — Kanesaka Berner & Partners, LLP

(57) ABSTRACT

A control method of a filled water volume in a fluid space requiring a water filling test is disclosed. The method includes disposing a pipe in the fluid space and enclosing the pipe with an enclosure, detecting pressure of a water filled portion in the fluid space or outside of the enclosure, and controlling the volumes of filling fluid and water to a water filling portion in the fluid space inside and outside the enclosure based on the detected pressure such that the pressure in the enclosure becomes higher than the pressure at the water filling part in the fluid space outside the enclosure.

8 Claims, 5 Drawing Sheets

CONTROL METHOD AND DEVICE OF FILLED WATER VOLUME IN FLUID SPACE

RELATED APPLICATIONS

The present application is a National Phase of International Application Number PCT/JP2007/070758 filed Nov. 6, 2007, the disclosure of which is hereby incorporated by reference herein in its entirety.

BACKGROUND OF THE INVENTION

1. Field of the Invention

This application relates to a control method and a device thereof for controlling a filled water volume when a filling water test (such as a pressure withstanding test, a leak test and the like) is needed for a fluid space (a storage fluid space).

A filling water test for proving pressure withstanding performance is often required for a vessel that forms a fluid space such as a liquid storage tank or a gas storage tank, by inducing and keeping water inside the fluid space, when the erection of the vessel is completed.

In conventional practices as to the filling water test, clean water such as industrial water or fresh water is used; however, in a case when the filling water test is performed at a place where clean water is hard-to-get, for instance, at many sites in South and Central America, Africa, and the Near and Middle East, a vast amount of clean water has to be purchased; as a result, the expenditure of money for the test becomes enormous. Thus, the filling water test is performed by use of salt containing water (such as seawater) that can be relatively inexpensive to purchase, in a case where the inner surface of the vessel (such as tanks) is resistant to the corrosion caused by the salt containing water.

2. Background of the Invention

However, the vessel that forms the fluid space (a storage fluid space) is often provided with at least one piping system inside the space, thereby the piping system is not necessarily resistant to corrosion even though the inner surface of the vessel (such as tanks) is resistant to corrosion. In these cases, corrosion prevention is required for the piping system when a filling water test by use of salt containing water is performed; whereby, the piping system is not arranged in the filling water space during the filling water test (namely, if the piping system is once installed in the fluid space prior to the filling water test, then the piping system is removed outside), or a corrosion prevention treatment for the piping system is performed.

A concrete example in which the piping system in the fluid space is removed during the filling water test is a case where the vessel forming the fluid space (a storage fluid space) is a LNG tank storing liquefied natural gas (LNG); thereby, the piping system inside the space is used for charging LNG inside the space and discharging LNG outside the space. In general, the inner surface of the LNG tank is that of stainless steel (such as Cr-9Ni stainless steel) that has excellent strength and toughness in a low temperature use-environment (in a cryogenic environment), while the piping inside the fluid space is made of stainless steel that may corrode in a salt containing water environment in a case of the filling water test. In the cases like this, as shown in FIG. 5 that explains the steps as to a conventional filling water test, the test is performed under the condition that the piping system inside the fluid space is not arranged during the test; after the filling water test is finished, the piping system is installed in the fluid space.

In consultation with FIG. 5, the steps of the conventional filling water test in which salt containing water, namely, seawater is used will now be explained. When the erection of a LNG tank 1 is completed, a temporary piping system 50 is arranged between the LNG tank 1 and a sea 51. In addition, there are provided a pump 52 that charges seawater into the LNG tank 1 through the temporary piping system 50 and a pump 53 that discharges the charged seawater through the temporary piping system 50. After the arrangement regarding the temporary piping system 50 and the pumps 52 and 53 is finished, seawater is charged into the LNG tank 1 by use of the pump 52. When the LNG tank 1 is fully filled with seawater after the seawater charging, the filled state is kept for a fixed time period; then, the seawater inside the LNG tank is discharged back to the sea 51. On an as needed basis, a buffer pool 54 is sometimes provided on a part way of the temporary piping system. After the seawater discharge is finished, the temporary piping system 50 is removed, and an inside piping system 5 that the storage fluid space is provided with is installed.

According to the conventional method of the filling water test as depicted in FIG. 5, the inside piping system that is provided inside the tank can be free from corrosion, since the inside piping system is placed outside of the tank during the filling water test; however, since the installation of the inside piping system is performed after the filling water test is finished, the tank erection time is prolonged due to the time required for the filling water test; thus, the erection cost including the inspection cost increases.

On the other hand, regarding a corrosion protection method for the inner surfaces of the tank in a case of the filling water test, the patent reference 1 discloses a method in which a plurality of welding parts as to the inside surface of the tank are vinyl-covered by uses of double-face tape; further, the patent reference 2 discloses a method in which Zn (zinc) coating material is applied to a plurality of welding parts as to the inside surface of the tank.

According to the disclosures of the references 1 and 2, however, it requires a plenty of time to apply the corrosion protection treatments to the potentially corrosive parts of the piping system installed inside the tank, in a case where the surface area of the pipes in the piping system is large: thus, the corrosion protection treatments according to the disclosures also require a plenty of time, prolonging the erection schedule as is the case in the manner where the inside piping system is not installed during the filling water test that FIG. 5 explains concretely.

SUMMARY OF THE INVENTION

In relation to the above, it can be taken into consideration that the inside piping system installed in the storage fluid space is enclosed with an enclosure of corrosion resistant material, and the filling water test is performed; however, there is a potential difficulty where the enclosure of corrosion resistant material is damaged due to the inappropriate charging water rate or the inappropriate balance (namely, a water pressure balance) between the outside and inside of the enclosure; thus, there may be a possibility the inside piping system will come in contact with water (seawater).

In view of the above-stated conventional technologies and anticipated solutions thereof, the present disclosure aims at providing a control method and a device of a filled water volume in a storage fluid space whereby the fluid space can be filled with water, by controlling the filled water volume, so that at least one inside piping system installed in the fluid space is prevented from coming in contact with the filled water.

In order to achieve the above objective, the present invention discloses a control method for a filled water volume in a storage fluid space for which a filling water test is required, the space being provided with at least one piping system inside the space, and the method comprising the steps of:

enclosing the piping system inside the storage fluid space, with an enclosure;

detecting a pressure of a first water inside of the enclosure and a pressure of a second water outside of the enclosure within the storage fluid space;

controlling the first water volume inside of the enclosure and the second water volume outside the enclosure, based on the detected pressures, so that the pressure of the first water charged inside of the enclosure is higher than the pressure of the second water charged outside of the enclosure.

It is hereby noted that the examples of the fluid space are a fluid tank or vessel, a double hull tank or vessel, a pressure vessel with compartments, a heat exchanger of a duplex tube type and so on.

As described in the above disclosure, by enclosing the inside piping system (the piping system to be arranged inside the storage fluid space), the piping system can be kept from contact with the second water for a filled water volume. Further, the control method for the filled water volume comprises the steps of:

enclosing the piping system inside the space, with an enclosure;

detecting a pressure of a first water inside of the enclosure and a pressure of a second water outside of the enclosure within the storage fluid space;

controlling the first water volume inside of the enclosure and the second water volume outside the enclosure, based on the detected pressures, so that the pressure of the first water charged inside of the enclosure is higher than the pressure of the second water charged outside of the enclosure.

According to the just described control method, the pressure inside the enclosure expands the enclosure outward, against the second water pressure outside of the enclosure; thus, a cross section of the expanded enclosure can be kept in a section of a regular shape; and, the enclosure can be prevented from coming in contact with the protrusive parts around the inside piping system so that the enclosure can be free from damage.

Further, a small clearance that may appear between the inner side of the enclosure and the inside piping system due to the adhesion of the bag toward the inside piping system can be evaded; thus, the so-called crevice corrosion due to concentration cell corrosion which is caused by a higher concentration of ion such as chloride inside the clearance and a lower concentration outside the clearance can be evaded.

In addition, a lower end of the inside piping system is preferably located over the inner bottom surface of the storage fluid space, with a space (of an interval), because the enclosure that has an opening and is folded with the opening directed upward can be placed into the space (of the interval), and the folded enclosure can be lifted up so that the folded enclosure is extended, and the enclosure easily encloses the inside piping system, if there is such a space (of an interval).

An example of the above-described disclosure is the control method for a filled water volume in the storage fluid space, the pressure of the first water charged inside of the enclosure being $p_1$, the pressure of the second water charged outside of the enclosure being $p_2$, and the enclosure being damaged when the pressure difference between the first water and the second water reaches a pressure difference (an allowable pressure difference) $\Delta P$, wherein the first water volume inside of the enclosure and the second water volume outside the enclosure are controlled so that a relation $0 < p_1 - p_2 < \Delta P$ holds.

It is hereby noted that the pressure difference $(p_1 - p_2)$ has to be positive in order that the pressure inside the enclosure is higher than the pressure outside the enclosure within the storage fluid space.

Further, the pressure difference $(p_1 - p_2)$ has to be lower than the allowable pressure difference $\Delta P$, in order that the enclosure is free from damage, as well as is prevented from coming in contact with the second water for a filled water volume; thus, the control as to the pressures may be performed under the condition that the pressure difference $(p_1 - p_2)$ is lower than the allowable pressure difference $\Delta P$.

Accordingly, by controlling the charging flow rate as to the first water and the second water so that the condition "$0 < p_1 - p_2 < \Delta P$" holds, the enclosure can be free from damage, and the inside piping system can be surely prevented from coming in contact with the second water for a filled water volume.

An example of the above-described disclosure is the control method for a filled water volume in the storage fluid space, a third liquid instead of the first water being charged inside of the enclosure, wherein the third liquid volume inside of the enclosure and the second water volume outside the enclosure are controlled so that the level of the third liquid inside of the enclosure is higher than the level of the second water volume outside the enclosure.

The deeper the depth levels of the second water, the higher the pressure that acts on the enclosure outside surface; since the pressure is of the fluid pressure, the nearer the depth level is to the second water (upper) surface, the lower the pressure is toward an atmospheric pressure; the pressure that acts on the enclosure outside surface becomes a highest pressure at the level of the lowermost position of the enclosure. If the fluid that is used as a substitute of the first water that is charged inside the enclosure is a gas, then the pressure field inside the enclosure is uniform; namely, the uniform gas pressure has to be higher than the highest pressure as to the second water at the level of the lowermost position of the enclosure; accordingly, the gas pressure has to be higher than the second water head corresponding to the second water pressure at the level of the lowermost position of the enclosure; however, the second water head (namely, the uniform gas pressure) is possibly high enough to cause damage to the enclosure at a position level nearer to the second water surface, since the difference between the pressures inside and outside of the enclosure at the position level is high enough to exceed an allowable limit as to the enclosure strength.

When the fluid that is used as a substitute of the first water that is charged inside the enclosure is a liquid (the third liquid), the nearer the depth level is to the third liquid (upper) surface, the lower the pressure is toward an atmospheric pressure; thus, the difference between the pressures inside and outside of the enclosure at the position level nearer to the third liquid (upper) surface is not so high, in comparison with the case where the fluid that is used as a substitute of the first water that is charged inside the enclosure is a gas; therefore, the risk of damage as to the enclosure is reduced.

Further, if, for example, a liquid the specific gravity of which is larger than that of the second water is charged inside the enclosure, there may be a case where the pressure at a height level inside the enclosure is appropriately higher than the pressure at the same level outside the enclosure even though the liquid surface level is lower than the second water surface level; however, in such a case, at a height level where the second water exists outside the enclosure but air exist upper the third liquid surface inside the enclosure, there is a possibility (risk) that the cross section shape of the enclosure at the height level is out of a regular cross section shape to be maintained along the vertical direction. Therefore, by keeping the surface level of the liquid inside the enclosure higher than the surface level of the second water outside the enclosure, the regular cross section shape as to the expanded enclosure can be maintained at any height level as to the enclosure.

An example according to the above-described disclosure the above examples is the control method for a filled water volume in the storage fluid space, a third liquid or the first water being charged inside of the enclosure, thereby a pressure of the third liquid or the first water inside of the enclosure and a pressure of a second water outside of the enclosure within the storage fluid space are detected;

wherein, according to the detected pressures inside and outside of the enclosure, the discharging amounts as to the third liquid or the first water inside of the enclosure as well as the second water volume outside the enclosure are controlled so that the pressure inside of the enclosure is higher than the pressure outside of the enclosure.

Further, according to the method described just above, third liquid or the first water inside the enclosure and the second water outside the enclosure can be discharged outside of each filled fluid space, under the condition that the inside piping system is prevented from coming in contact with the second water for the filled water volume, and the piping system is also prevented from coming in contact with the enclosure.

Thus, the inside piping system can be free from corrosion while each fluid is being discharge from the filled fluid space after the filling water (fluid) test has been performed, or while each fluid is being discharge from the filled fluid space during the fine adjustment as to each filled fluid volume.

Further, in discharging each water or liquid, by controlling the discharging flow rates as to each water or liquid so as to keep the condition "$0<p_1-p_2<\Delta P$", the enclosure damage can be prevented and the inside piping system can be surely prevented from coming contact with the second water, whereby $p_1$ is the pressure of the first water or the third liquid inside the enclosure, $p_2$ is the pressure of the second water outside the enclosure in the second water space, and $\Delta P$ is the pressure difference between the first water (or the third liquid) and the second water, as described before.

Further, the present invention discloses a control device for a filled water volume in a storage fluid space for which a filling water test is required, the space being provided with at least one piping system inside the space, and the device comprising:

an enclosure that encloses each piping system inside the space;

a pressure detecting means that detects a pressure of a first water inside of the enclosure or a pressure of a second water outside of the enclosure within the storage fluid space;

a control means that controls the first water volume inside of the enclosure and the second water volume outside the enclosure, based on the detected pressures, so that the pressure of the first water charged inside of the enclosure is higher than the pressure of the second water charged outside of the enclosure within the storage fluid space.

An example according to the above device disclosure is the control device for a filled water volume in the storage fluid space, the pressure of the first water charged inside of the enclosure being $p_1$, the pressure of the second water charged outside of the enclosure being $p_2$, and the enclosure being damaged when the pressure difference between the first water and the second water reaches a pressure difference $\Delta P$, wherein the control means controls the first water volume inside of the enclosure and the second water volume outside the enclosure so that a relation $0<p_1-p_2<\Delta P$ holds.

Further, an example according to the above device disclosure is the control device for a filled water volume in the storage fluid space, a third liquid instead of the first water being charged inside of the enclosure, wherein the control means controls the third liquid volume charged inside of the enclosure and the second water volume charged outside the enclosure so that the level of the third liquid inside of the enclosure is higher than the level of the second water volume outside the enclosure.

Further, an example according to the above device disclosure or the above examples is the control device for a filled water volume in the storage fluid space, thereby a pressure of the third liquid or the first water inside of the enclosure and a pressure of a second water outside of the enclosure within the storage fluid space are detected;

wherein, according to the detected pressures inside and outside of the enclosure, the control means controls, the discharging amounts as to the third liquid or the first water inside of the enclosure as well as the second water volume outside the enclosure, so that the pressure inside of the enclosure is higher than the pressure outside of the enclosure.

Based on the present invention as described thus far, by controlling the filled water (water or liquid) volume, a control method and a device thereof for controlling a filled water volume in a storage fluid space in which at least one inside piping system is installed can be provided, whereby the installed piping system can be prevented from coming contact with the corrosive water (liquid) for the filled water (liquid) space

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Embodiment 1

The following explanation of the embodiment 1 according to the present invention will be made based on the premise that the storage fluid space is of a LNG tank.

Figure 1:
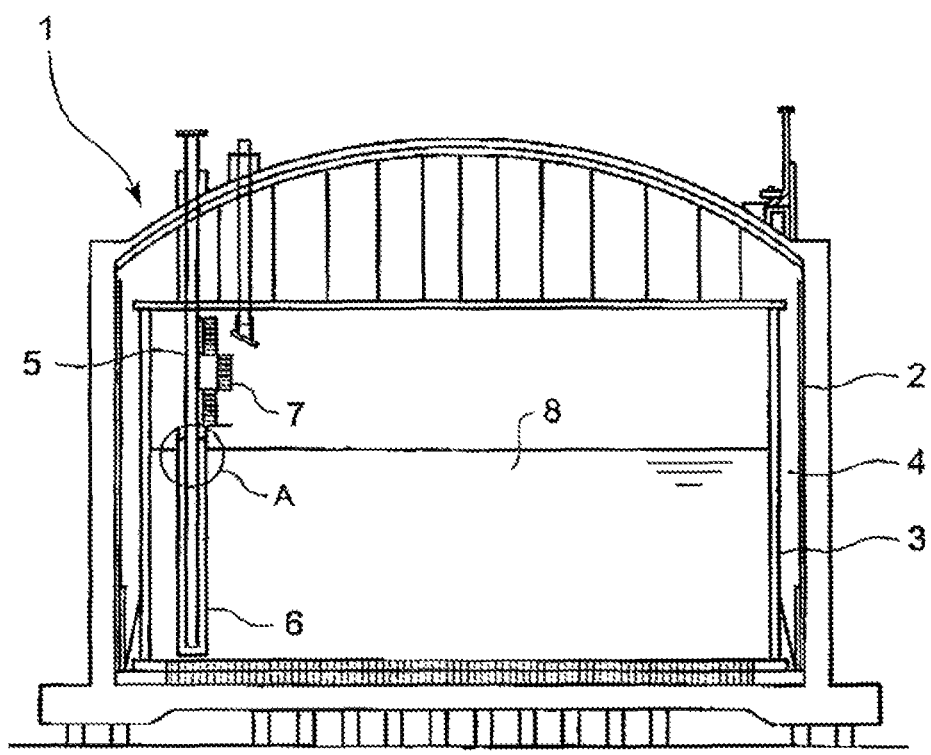
FIG. 1 shows an outline of a LNG tank in relation to a filling water test, according to an embodiment of the present invention.

FIG. 1 shows an outline of a LNG (Liquefied Natural Gas) tank in relation to a filling water test (such as a pressure withstanding test, a leak test and the like), according to an embodiment of the present invention.

According to FIG. 1, the outline of a LNG tank is explained. A LNG tank includes an inner vessel 3 that stores LNG and an outer vessel 2 that surrounds the inner vessel; the LNG tank is of a double hull structure. The inner vessel that comes in contact with LNG the temperature of which is of minus 162° C. or below is made of stainless steel (such as Cr-9Ni stainless steel) that has sufficient strength and toughness and is hard to brittle in the cryogenic environment. Heat insulating material is arranged in a space 4 between the inner vessel 3 and the outer vessel 2 so that heat transfer from the outside of the LNG tank into the tank is restrained to a minimal level. The outer vessel 2 keeps hold of the heat insulating material, and is gas-tightly manufactured so as to restrain the heat transfer.

Inside the LNG tank 1, the tank is provided with at least one piping system 5 through which LNG is charged from or discharged toward outside; the piping system penetrates an upper part of the LNG tank, and an end of the piping system is communicated with a LNG supply source (a receiving junction) or a LNG service port (a delivering base); on the other hand, another end (a lower end) of the inside piping system 5 is located over the inner bottom surface of the inner vessel 3, with a space so that the inner bottom surface does not comes in contact with the lower end of the piping system 5, the system 5 being suspended inside of the tank. In FIG. 1, one piping system 5 is depicted; however, there may be a case where a plurality of the piping systems is provided.

Inside the inner vessel 3, an inside staircase 7 is provided so that a worker can access the inside of the tank, when the tank is empty.

When the erection of these LNG tanks has completed, a filling water test (such as a pressure withstanding test, a leak test and the like) is required in order to verify the pressure withstanding performance of the inner vessel 3, by charging water into the tank and keeping the water in the tank. In this embodiment, the filling water test is performed by use of seawater; however, since the inside piping system 5 made of stainless steel may corrode when the piping system comes in contact with seawater, it is required that the piping system be prevented from coming in contact with seawater.

Figure 2:
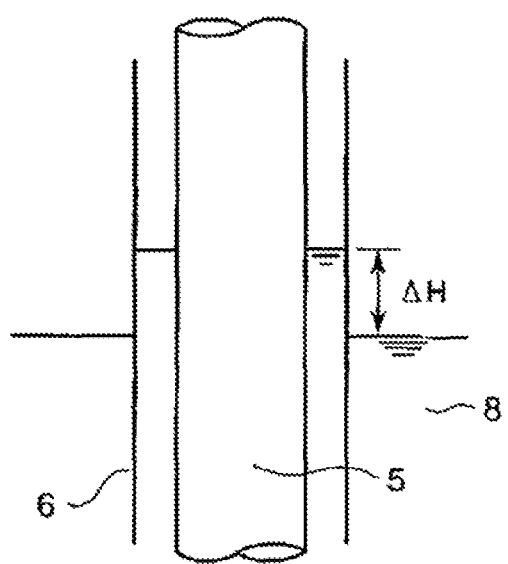
FIG. 2 shows an enlargement of the part A in FIG. 1.
Figure 3:
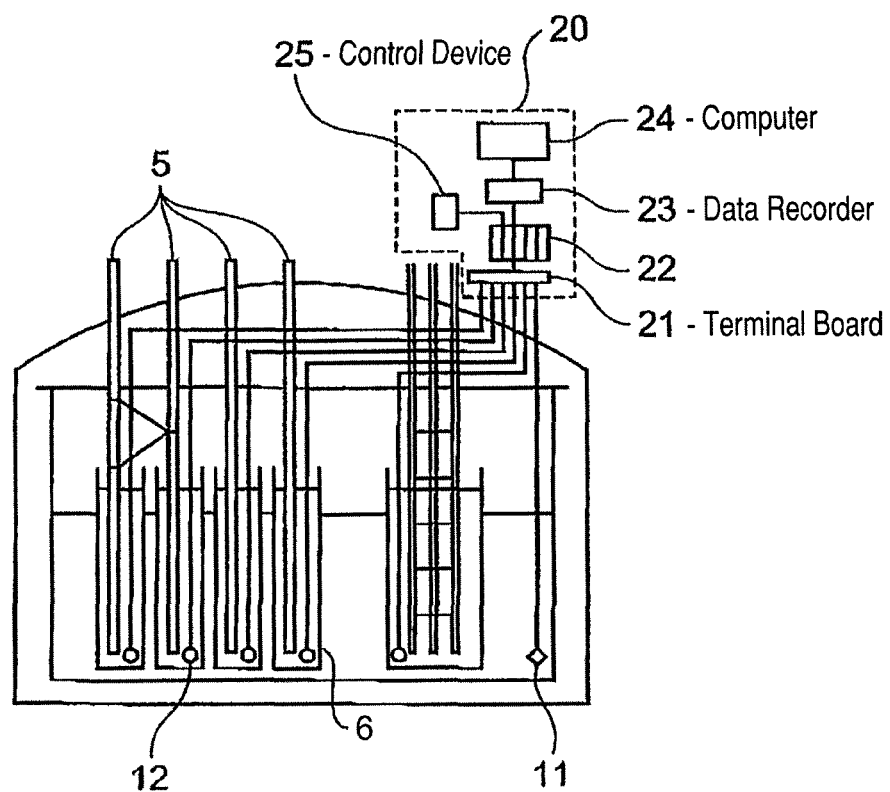
FIG. 3 shows an outline of a control device for a filled water volume in a LNG tank for which a filling water test is performed.
Figure 4:
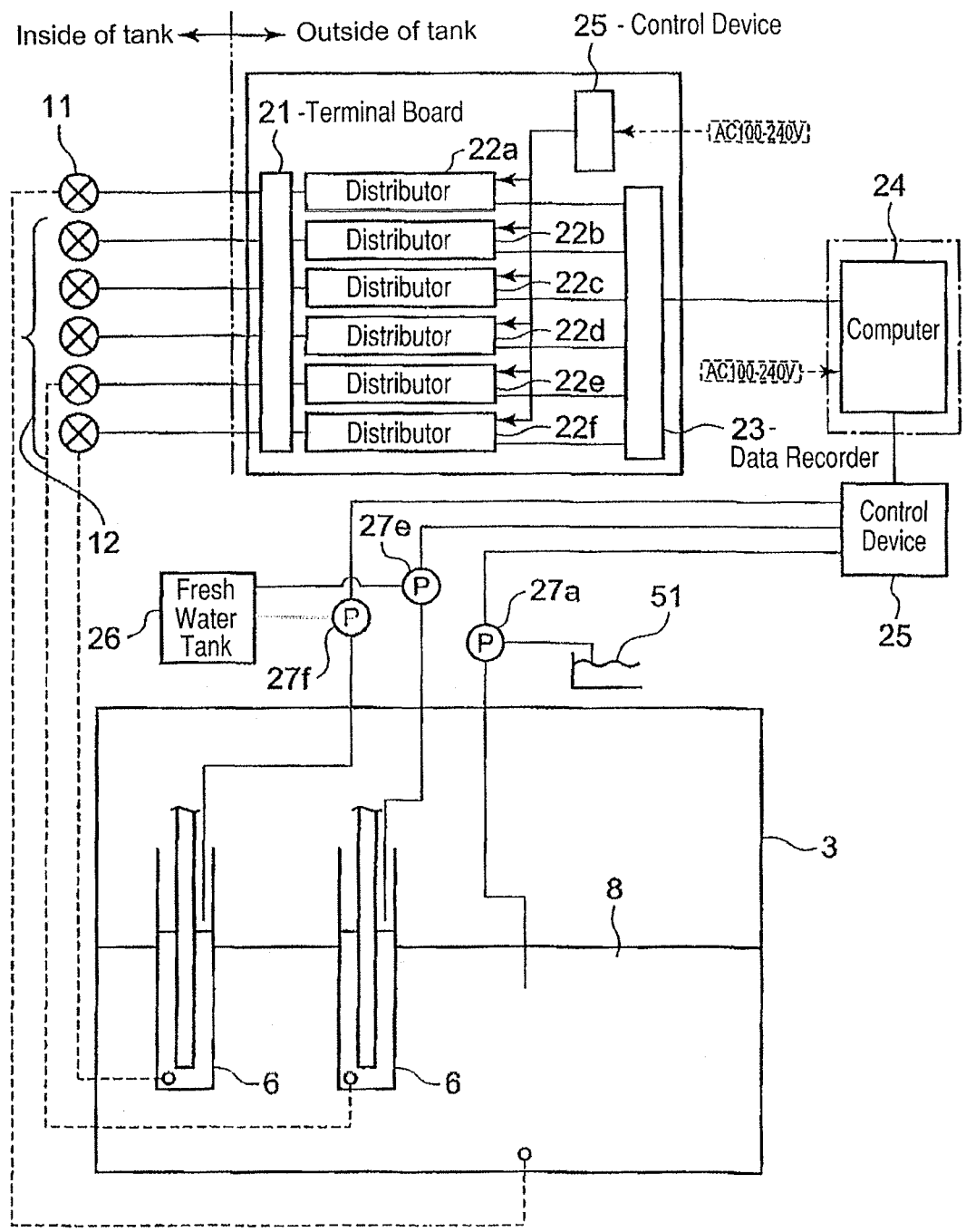
FIG. 4 shows a graphical diagram as to the control device for a filled water volume in a LNG tank for which a filling water test is performed.
Figure 5:
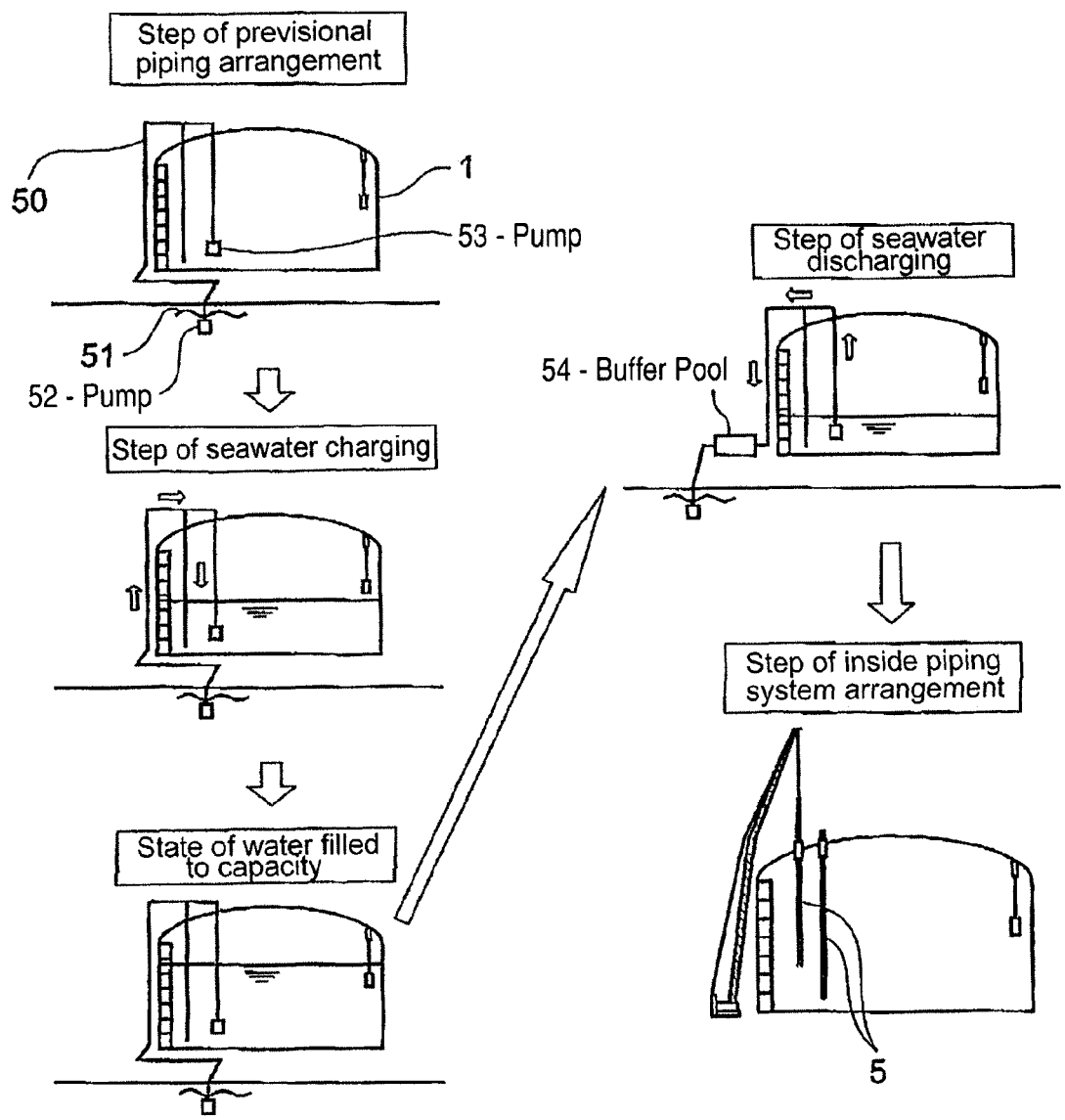
FIG. 5 explains a series of steps as to a conventional filling water test by filling seawater.

FIG. 2 shows an enlargement of the part A in FIG. 1; FIG. 3 shows an outline of a control device for a filled water volume in a LNG tank for which a filling water test is performed; FIG. 4 shows a graphical diagram as to the control device for a filled water volume in a LNG tank for which a filling water test is performed.

In the next place, a method of the filling water test as to the LNG tank is now explained, the filling water test basically comprising the steps of:
(1) enclosing the inside piping system 5 with a curing enclosure bag 6;
(2) charging fresh water into the curing enclosure bag 6 and seawater into the inner vessel 3, so that a fresh water pressure at a level in the curing enclosure bag 6 is higher than a seawater pressure at the same level in the inner vessel 3;
(3) keeping the charged seawater for a predetermined period after a predetermined amount of the seawater is charged into the inner vessel 3;
(4) discharging the fresh water out of the curing enclosure bag 6 and the seawater out of the inner vessel 3.

Following the above, the steps (1) to (4) are explained in detail. In the embodiment, a filling water test in a case of a LNG tank in which the depth of the inner vessel is 50 m is taken into consideration.

The specific gravity of LNG at minus 162° C. that is a LNG storage temperature is 0.42 and the specific gravity of seawater is 1.03; therefore, the storage of LNG up to the fill depth of 50 m corresponds to the seawater depth of 50 m×(0.42/1.03) =20.4 m; accordingly, a filling LNG test of 50 m depth can be modeled by a filling seawater test of 20.4 m. Thus, an actual pressure withstanding performance can be ascertained by the filling seawater test. In this embodiment the seawater depth of 25 m by the pressure-withstanding test is taken into account, in consideration of an allowance.

(1) Regarding the step of enclosing the inside piping system 5 with a curing enclosure bag 6:

In performing the filling water test, the first step of enclosing the inside piping system 5 with a curing enclosure bag 6 is performed. A curing enclosure bag 6 may be used, whereby the curing enclosure bag is of a cylindrical shape and made of polyvinyl chloride, and the lower bottom part of the bag 6 is closed, while the upper bottom of the bag 6 is open. The curing enclosure bag 6 configured as such is folded so that the curing enclosure bag 6 is placed below the lower end of the inside piping system 5 whereby the open upper bottom side of the bag is facing upward. Then, the upper side part of the bag is lifted up so that the folded bag is extended, and the bag encloses the inside piping system 5. In a case where a plurality of inside piping systems 5 is provided, each piping system 5 is enclosed by a curing enclosure bag 6. In this way, the lifted-up bag that encloses the piping system continues to be hanged while the step (1) is proceeding to the next step.

It is noted that the enclosing range that the curing enclosure bag 6 covers the inside piping system 5 needs to include the range from the lower end of the inside piping system 5 to the filled water surface level (namely, the level of 25 m height from the bottom of the inner vessel, in the case of this embodiment).

Further, it is necessary that the material of the bag 6 be a material which does no corrode even when the bag comes in contact with seawater; in addition, it is preferable that the bag is made of a soft material, since the bag has to be folded so as to be placed below the lower end of the inside piping system 5, as described above; namely, it is preferable that the bag is made from a thin layer sheet of soft synthetic resin, especially, of fiber reinforced polyvinyl chloride.

(2) Regarding the step of charging fresh water into the curing enclosure bag 6 and seawater into the inner vessel 3, so that a fresh water pressure $p_1$ at a level in the curing enclosure bag 6 is higher than a seawater pressure $p_2$ at the substantially same level in the inner vessel 3:

After the curing enclosure bag 6 encloses the inside piping system 5 in the former step, the inside space of the bag 6 is charged with fresh water, and the outside space (namely, the space inside the inner vessel 3) of the bag 6 is charged with seawater; thus a filling water stage is performed (or, started). As FIG. 3 depicts, at a lower position inside each enclosure bag 6 that encloses each of a plurality of inside piping systems 5, a fresh water pressure sensor 12 of a water proof type is provided; on the other hand, a seawater pressure sensor 11 of a seawater proof type is provided inside the inner vessel 3 and outside of the enclosure bag 6. In a case where a permanently installed pressure sensor for detecting the pressure of the fluid stored inside the inner vessel is provided, the permanently-installed pressure sensor may be used as a substitute of the seawater pressure sensor. In addition, it is preferable that the installation height level as to the freshwater pressure sensor is close to that as to the seawater pressure sensor as far as possible.

The signal of the pressure $P_1$ detected by the fresh water pressure sensor 12 and the signal of the pressure $P_2$ detected by the seawater pressure sensor 11 are transferred to a filled water volume control device 20.

Based on FIG. 4, the filled water volume control device 20 is now explained. Inside the inner vessel 3, each of the five inside piping systems 5 (only 2 systems are shown in FIG. 4) is enclosed by a curing enclosure bag 6. The signal for the pressure $p_1$ detected by the fresh water sensor 12 that is provided in each of the curing enclosure bags 6 is transmitted to a plurality of distributors 22b, 22c, 22d, 22e, and 22f via a terminal board 21 where the signal transformation is performed so that the signal is transmitted to a control device 25 via a data recorder 23 and a (personal) computer 24. Further, the signal for the pressure $p_2$ detected by the seawater sensor 11 that is provided in the seawater 8 inside the inner vessel 3 is transmitted to a distributor 22a via the terminal board 21 where the signal transformation is performed so that the signal is transmitted to a control device 25 via the data recorder 23 and the (personal) computer 24. In the control device 25, the revolution speeds as to a plurality of pumps 27b, 27c, 27d, 27e, and 27f (only the pumps 27e and 27f are shown in FIG. 4) that convey fresh water from a fresh water tank 26 to the inside of the enclosure bags 6, as well as, the revolution speed as to a pump 27a that convey seawater from a sea 51 to the inside of the inner vessel are regulated so that the pressure $p_1$ inside the enclosure bag 6 is higher than the pressure $p_2$ outside of the enclosure bag 6, based on the detected pressures $p_1$ and $p_2$. In addition, the signals as to the pressures $p_1$ and $p_2$ detected by the seawater pressure sensor 11 and the fresh water pressure sensor 12 are sent from the distributors 27a, 27b, 27c, 27d, 27e, and 27f to the data recorder 23, for data recording by the recorder 23 as well as for data displaying by the (personal) computer 24.

Thus, by controlling the charging flow rates as to the fresh water and the seawater based on the pressure detecting results, the pressure inside each of the enclosure bags 6 expands the enclosure bag 6 outward, against the seawater pressure outside of the bag 6; thus, a cross section of the expanded bag 6 can be kept in a section of a regular shape; and, the enclosure bag can be prevented from coming in contact with the protrusive parts around the inside piping system 5 so that the bag can be free from damage. Further, a small clearance that may appear between the inner side of the bag 6 and the inside piping system 5 due to the adhesion of the bag toward the inside piping system can be evaded; thus, the so-called crevice corrosion due to concentration cell corrosion which is caused by a higher concentration of ion such as chloride inside the clearance and a lower concentration outside the clearance can be evaded.

(3) Regarding the step of keeping the charged seawater for a predetermined period after a predetermined amount of the seawater is charged into the inner vessel 3:

After the inner vessel 3 is filled with a predetermined amount of the seawater (the amount of seawater corresponds to a volume of 25 m height in the inner vessel 3 in this embodiment) in the former step, the seawater filled condition is maintained for a predetermined period; thereby, the relative relation between the pressure $p_1$ inside the enclosure bag 6 and the pressure $p_2$ outside of the enclosure bag 6 in the inner vessel 3 is kept as same as is in the case of the former step where the freshwater and seawater are charged; and, the pressure sensors 11 and 12 as well as the control device is kept under operation conditions.

(4) Regarding the step of discharging the fresh water out of the curing enclosure bag 6 and the seawater out of the inner vessel 3:

After the seawater filled condition is maintained for the predetermined period based on the filling water test specification, the seawater in the inner vessel 3 and the fresh water in the enclosure bag 6 are discharged.

While the seawater in the inner vessel 3 and the fresh water inside the enclosure bag 6 are being discharged, the condition that the pressure $p_1$ inside the enclosure bag 6 is higher than the pressure $p_2$ inside the inner vessel 3 is maintained as same as is in the case of the former step where the fresh water and seawater are charged. Thus the step of discharging the fresh water and the seawater proceeds.

In discharging the seawater and the fresh water, the control as to the pressures $p_1$ and $p_2$ is performed also by means of the filled water volume control device 20 that is used for charging the seawater and the fresh water; thereby, the device 20 comprises the terminal board 21, the distributors 22a to 22f, the data recorder 23, the personal computer 24, and the control device 25; each of the comprised components is used in charging the seawater and the fresh water. The pumps 27a to 27f that are used for charging the seawater and the fresh water may be used for discharging the seawater and the fresh water; or, a plurality of additional pumps for only discharging may be provided.

In discharging the seawater and the fresh water, the filled water volume control device 20 controls the discharging flow rates as to the discharging pumps that discharge the freshwater and the seawater, based on the pressures $p_1$ and $p_2$ that are detected by the seawater pressure sensor 11 and the fresh water sensor 12 respectively, so that the pressure $p_1$ is higher than the pressure $p_2$.

According to this discharging control manner, the pressure inside each of the enclosure bags 6 expands the enclosure bag 6 outward, against the seawater pressure outside of the bag 6; thus, a cross section of the expanded bag 6 can be kept in a section of a regular shape; and, the enclosure bag can be prevented from coming in contact with the protrusive parts around the inside piping system 5 so that the bag can be free from damage. Further, a small clearance that may appear between the inner side of the bag 6 and the inside piping system 6 due to the adhesion of the bag toward the inside piping system can be evaded; thus, the so-called crevice corrosion due to concentration cell corrosion which is caused by a higher concentration of ion such as chloride inside the clearance and a lower concentration outside the clearance can be evaded.

After the seawater and the fresh water are discharged, the enclosure bag is removed.

When a filling water test is performed for the LNG tank of 50 m in depth, about one week is required for the water charging; about two days for the filled water keeping; about one week for the water discharging. Thus, considerable time spans are required in general. However, when the filling water test is performed according to the steps (1) to (4) as described above, the inside piping systems 5 are always keeping contact with not seawater but fresh water; therefore, the inside piping systems are free from corrosion due to seawater. Further, the fresh water inside the enclosure bag and the seawater outside the bag are charged or discharged while the pressures inside and outside of the bag are controlled; therefore, over-charging or excessive discharging as to the fresh water or the seawater can be evaded.

In this way, by detecting the pressures inside and outside of the bag as well as by controlling the filling water flow rates based on the detected pressures, a water filling test can be performed so that the inside piping systems that are provided in the inner vessel does not come in contact with the water inside the inner vessel.

In addition, if an alarm device is provided whereby the alarm device issues an alarm indicating that the control condition $0 < p_1 - p_2 < \Delta P$ is out of order, then an abnormal situation as to the pressure sensors 11 and 12, as well as the pumps 27a to 27f can be informed of.

INDUSTRIAL APPLICABILITY

A device of a filled water volume in a storage fluid space is provided whereby the fluid space can be filled with water, by controlling the filled water volume, so that at least one inside piping system installed in the fluid space is prevented from coming in contact with the filled water.

The device and the control method therein can be used for the erection of a various kind of industrial vessels, tanks and the like where a filling water test or a leak test by filling fluid is required.

The invention claimed is:

1. A control method for a filled water volume in a storage fluid space having at least one piping system, comprising:
    providing an enclosure;
    enclosing the at least one piping system inside the storage fluid space with said enclosure;
    detecting a pressure of a first body of water inside the enclosure and a pressure of a second body water outside the enclosure within the storage fluid space;
    controlling the volume of the first body of water inside the enclosure and the volume of the second body of water outside the enclosure based on the detected pressures so that the pressure of the first body of water charged inside the enclosure is higher than the pressure of the second body water charged outside the enclosure.

2. The control method according to claim 1, further comprising
    determining the pressure of the first body of water charged inside the enclosure being a first pressure $p_1$,
    determining the pressure of the second body of water charged outside the enclosure being a second pressure $p_2$,
    calculating an allowable pressure difference $\Delta P_{Allowable}$ between the first body of water and the second body of water, and
    controlling the volume of the first body of water inside of the enclosure and the volume of the second body of water outside the enclosure so as to keep a relation $0 < p_1 - p_2 < \Delta P_{Allowable}$.

3. The control method according to claim 1, wherein said first body of water is a third liquid being charged inside of the enclosure,
    wherein a volume of the third liquid charged inside the enclosure and the volume of the second body of water charged outside the enclosure are controlled so that a level of the third liquid inside the enclosure is higher than a level of the second water volume outside the enclosure.

4. The control method according to claim 1, further comprising
    charging a third liquid or the first body of water inside the enclosure, detecting a pressure of the third liquid or the first body of water inside the enclosure and a pressure of a second body of water outside of the enclosure within the storage fluid space; and
    controlling, according to the detected pressures inside and outside of the enclosure, discharging amounts as to the third liquid or the first body of water inside of the enclosure as well as the volume of the second body of water outside the enclosure so that the pressure inside of the enclosure is higher than a pressure outside of the enclosure.

5. A control device for a filled water volume in a storage fluid space having at least one piping system, comprising:
    an enclosure that encloses each piping system inside the fluid storage space;
    a pressure detecting means that detects a pressure of a first body of water inside of the enclosure and a pressure of a second body of water outside the enclosure within the storage fluid space;
    a control means that controls the volume of the first body of water inside the enclosure and the volume of the second body of water outside the enclosure based on the detected pressures so that the pressure of the first body of water charged inside of the enclosure is higher than the pressure of the second body of water charged outside of the enclosure.

6. The control device according to claim 5, wherein the pressure of the first body of water charged inside the enclosure is a first pressure $p_1$, the pressure of the second body of water charged outside the enclosure is a second pressure $p_2$, and an allowable pressure difference between the first body of water and the second body of water is $\Delta P_{Allowable}$, and wherein the control means controls the volume of the first body of water inside of the enclosure and the volume of the second body of water outside the enclosure so as to keep a relation $0 < p_1 - p_2 < \Delta P_{Allowable}$.

7. The control device according to claim 5, wherein the first body of water is a third liquid charged inside the enclosure,
    wherein the control means controls a volume of the third liquid charged inside the enclosure and a volume of the second body of water charged outside the enclosure so that the level of the third liquid inside of the enclosure is higher than a level of the volume of the second body of water outside the enclosure.

8. The control device according to claim 5, wherein a pressure of a third liquid or the first body of water inside of the enclosure and a pressure of a second body of water outside of the enclosure within the storage fluid space are detected;
    wherein the control means controls discharging amounts of the third liquid or the first body of water inside the enclosure as well as the volume of the second body of water outside the enclosure in accordance with the detected pressures inside and outside of the enclosure so that the pressure inside the enclosure is higher than the pressure outside the enclosure.

* * * * *